United States Patent [19]

Bickford

[11] Patent Number: 4,674,530
[45] Date of Patent: Jun. 23, 1987

[54] PRESSURE RELIEF DEVICE FOR VESSELS
[75] Inventor: Cleo M. Bickford, Cypress, Tex.
[73] Assignee: Anderson, Greenwood & Company, Houston, Tex.
[21] Appl. No.: 818,227
[22] Filed: Jan. 13, 1986
[51] Int. Cl.$^4$ ............................................. F16K 17/04
[52] U.S. Cl. ................. 137/469; 137/516.29; 137/541
[58] Field of Search ................ 137/469, 516.29, 541

[56] References Cited

U.S. PATENT DOCUMENTS

| | | | |
|---|---|---|---|
| 1,665,394 | 4/1928 | Willoughby | 137/516.29 X |
| 1,774,690 | 9/1930 | Willoughby | 137/541 |
| 2,517,858 | 8/1950 | Farris | 137/469 |
| 2,599,622 | 6/1952 | Folmsbee | 137/541 |
| 2,787,127 | 4/1957 | Benz | 137/469 X |
| 2,821,991 | 2/1958 | Marx | 137/541 X |
| 2,834,374 | 5/1958 | Klinkenberg | 137/541 |
| 3,035,604 | 5/1962 | Portis | 137/541 X |
| 3,422,840 | 1/1969 | Bryant | 137/469 X |
| 4,350,176 | 9/1982 | Lace | 137/469 X |

Primary Examiner—Robert G. Nilson
Attorney, Agent, or Firm—Vinson & Elkins

[57] ABSTRACT

A pressure relief device (28) removably secured to a pressure vessel (10) has a valve closure (83) including an inner valve plate (84) and an outer cover (96) thereover. A spindle (68) is secured separately to valve plate (84) and cover (96), and springs (80, 82) positioned below a tapered plug (54) urges valve closure (83) to a closed position. An elastomeric O-ring (108) between plate (84) and cover (96) forms the primary seal and may be removed and replaced while valve plate (84) remains in a seated closed position.

5 Claims, 5 Drawing Figures

PRESSURE RELIEF DEVICE FOR VESSELS

BACKGROUND OF THE INVENTION

This invention relates to a pressure relief device for a pressure vessel and more particularly to such a pressure relief device having a large flow capacity when actuated.

Heretofore, such as illustrated in U.S. Pat. No. 4,388,940 dated June 21, 1983, pressure relief devices having a relatively large discharge opening and flow capacity have been utilized in pressure vessels. However, pressure relief devices that are utilized with fixed pressure vessels normally do not have tight space restrictions and a discharge opening for such a fixed pressure vessel can be of practically any desired size or diameter. Thus, such pressure relief devices for fixed pressure vessels do not normally have to be designed specifically for fitting within a restricted space while having a sufficient flow area for the large discharge opening required for the discharge of lading upon the reaching of a predetermined high fluid pressure within the pressure vessel.

Further, a relatively large diameter actuating spring for seating the valve closure is normally utilized and if the spring extends upwardly into the discharge opening the flow area for the discharge opening is restricted by the spring. In such pressure relief devices for fixed pressure vessels, a relatively large mounting area compared to the flow area has been provided. For example, in the pressure relief device shown in U.S. Pat. No. 4,388,940 the diameter of the spring which extends into the discharge opening or flow area and forms the mounting area is around one-third the diameter of the entire discharge opening and thus occupies a large central mounting area within the discharge opening.

Additionally, in the event it has been necessary heretofore to replace the resilient or elastomeric sealing element for the closure member, it has normally required removal of the valve from the pressure vessel or disassembly of the valve. Thus, replacement of a sealing element has been time-consuming and expensive.

SUMMARY OF THE INVENTION

The pressure relief device comprising the present invention is particularly adapted for use with pressure vessels for transport vehicles, such as railway tank cars or highway trailers, which are utilized for the transport of toxic, flammable, or cryogenic fluids, such as butane, propane, anhydrous ammonia and LNG, for example. Particularly when employed with railway tank cars, the mounting area or space on the tank car for the pressure relief device is limited, and the pressure relief device must be designed to fit within such limited space in addition to having a relatively large flow area for discharge of substantial amounts of lading in the pressure vessel within a short period of time, such as might be required in a train accident with overturned railway cars and the like.

Also, a minimum projecting height from the tank car shell is required in such pressure relief devices so that there is less of a likelihood of failure of the valve upon accidents involving the tank cars.

To accomplish the above design objectives, the present invention includes a pressure relief device which may be removably connected to a mounting flange or support on the pressure vessel, such as a railway tank car which occupies a relatively small space on the tank car. As a result, the diameter of the discharge opening is relatively small. In order to achieve a maximum flow area through the discharge opening the pressure relief device has been designed with a spider having vanes secured to the mounting flange and projecting a substantial distance within the tank or pressure vessel while terminating at a lower plug below which the spring means for closing the valve is positioned. The flow passage for the lading upon opening of the pressure relief device is above the plug. Only the spider, which includes a close fitting central tube around a small diameter spindle or rod, is positioned within the flow area. The spring means and associated mounting elements for the spring means are all positioned inwardly of the plug with the plug acting as an outer stop for the spring so that the spring does not project within the discharge opening or obstruct the flow of lading from the tank car upon opening of the pressure relief device at a predetermined high pressure within the pressure vessel.

Another feature of the present invention involves the mounting and sealing of the valve closure onto the annular seat of the mounting support about the discharge opening in the pressure relief device so that the primary seal which comprises an O-ring may be replaced without reducing tank pressure, disassembly of the pressure relief device, or removal of the pressure relief device from the tank car. The valve closure includes a valve plate secured to the rod or spindle and engaging the annular seat on the mounting support in a metal-to-metal relation to provide the secondary seal, and a cover having a cylindrical recess receiving the plate and secured separately to the rod. The cover has a downwardly extending flange carrying an O-ring therein for primary sealing between the annular seat and valve closure. To replace the O-ring seal, the cover is removed from the rod and plate, leaving the plate seated in metal-to-metal relation on the annular seat. The O-ring seal carried by an annular groove in the cover can be easily removed and replaced, and the cover reassembled on the rod.

It is an object of the present invention to provide a pressure relief device for a pressure vessel which may be mounted within a limited mounting area or space on the pressure vessel, and yet provide a relatively large flow area for discharge of lading from the pressure vessel upon actuation of the pressure relief device at a predetermined high fluid pressure.

Another object of the invention is to provide such a pressure relief device for a railway tank car projecting a minimum distance from the exterior of the tank for minimizing failure resulting from accidents and extending a substantial distance within the tank car to provide a maximum unobstructed flow area in the discharge opening with the spring means for the pressure relief device occupying only a small portion of the area defined by the discharge opening.

A further object of the invention is to provide such a pressure relief device for a railway tank car in which the primary elastomeric seal for the valve closure member may be easily removed and replaced without any disassembly of the pressure relief device except for a cover carrying the seal with such removal and replacement occurring while a metal-to-metal seal is maintained.

Other objects, features, and advantages of this invention will become more apparent after referring to the following specification and drawings wherein.

Figure 1:
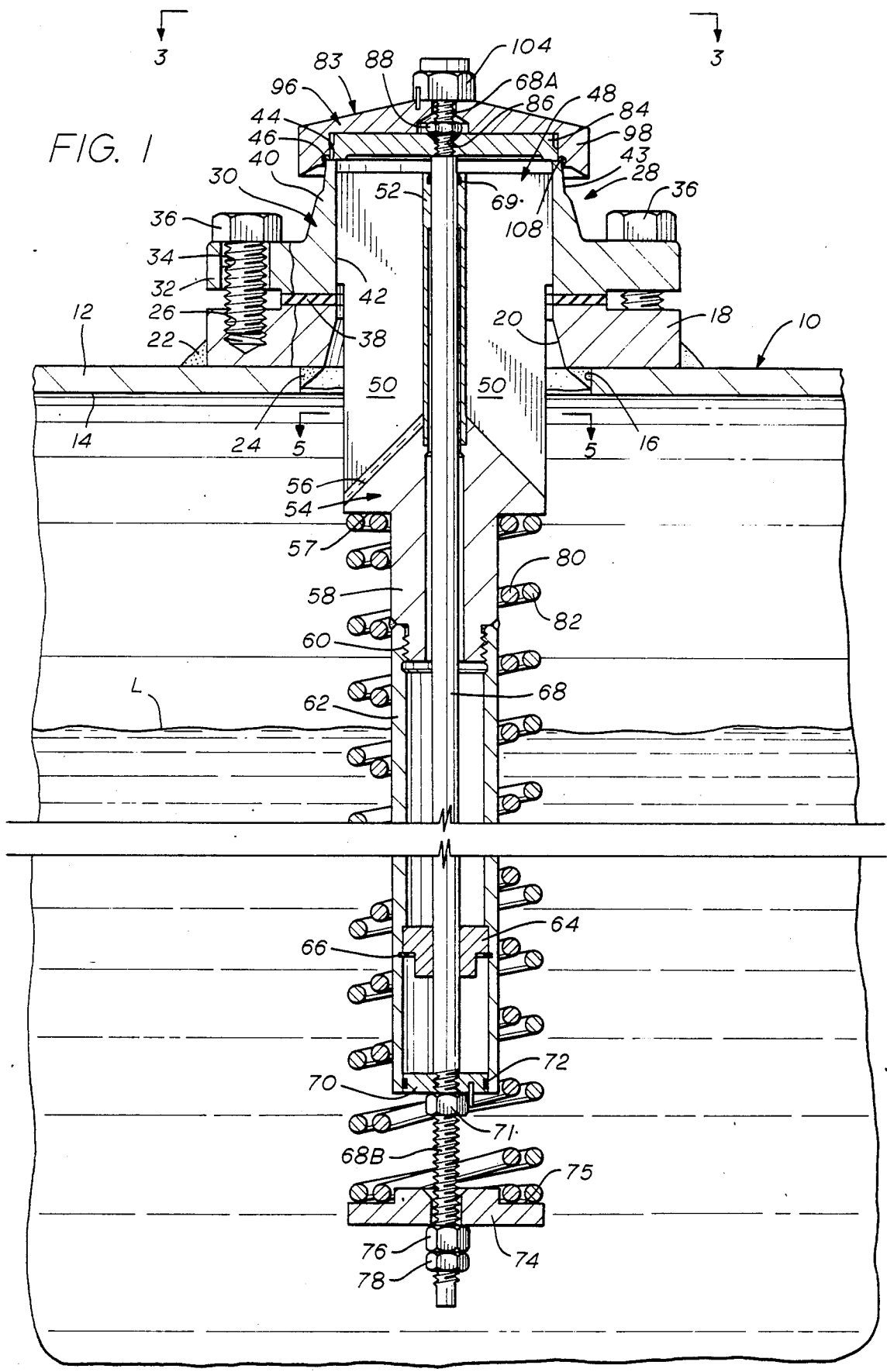
FIG. 1 is a sectional view of the pressure relief device comprising the present invention positioned on a mounting member of a pressure vessel and showing the pressure relief device in normal operating condition with the valve closure in closed seated position.

Referring now to the drawings for a better understanding of this invention, a pressure vessel is indicated generally at 10, such as a railway tank car, and having a cylindrical shell or wall 12 with its inner uppermost surface indicated at 14. Liquid lading is shown at L within the interior of tank shell 12. Shell 12 has an opening 16 therein and a lower mounting member or frame 18 having a tapered central discharge opening 20 therethrough is secured by welding at 22 to the outer surface of tank shell 12 and welding 24 to the edge of shell 10 defining opening 16. Mounting member 18 has a plurality of threaded openings 26 therein. It is understood that various other types of mounting flanges or mounting members could be provided, if desired, as well known in the art.

A pressure relief device is generally indicated at 28 and includes an upper mounting support or frame 30 having an outer radially extending flange 32 with a plurality of openings 34 therein. Externally threaded bolts 36 secure mounting flange 32 onto mounting member 18 with a suitable annular gasket 38 mounted therebetween. Mounting support 30 includes an annular axially extending flange 40 defining an inner peripheral surface 42 about the discharge opening forming a continuation of discharge opening 20 for the discharge of lading or the like upon opening of pressure relief device 28 as will be explained. Upwardly extending flange 40 has an outer tapered surface 43 and forms an upper annular horizontal seat or shoulder 44 defining a relatively sharp outer edge or corner 46 as particularly shown in FIG. 4.

Figures 3, 5:
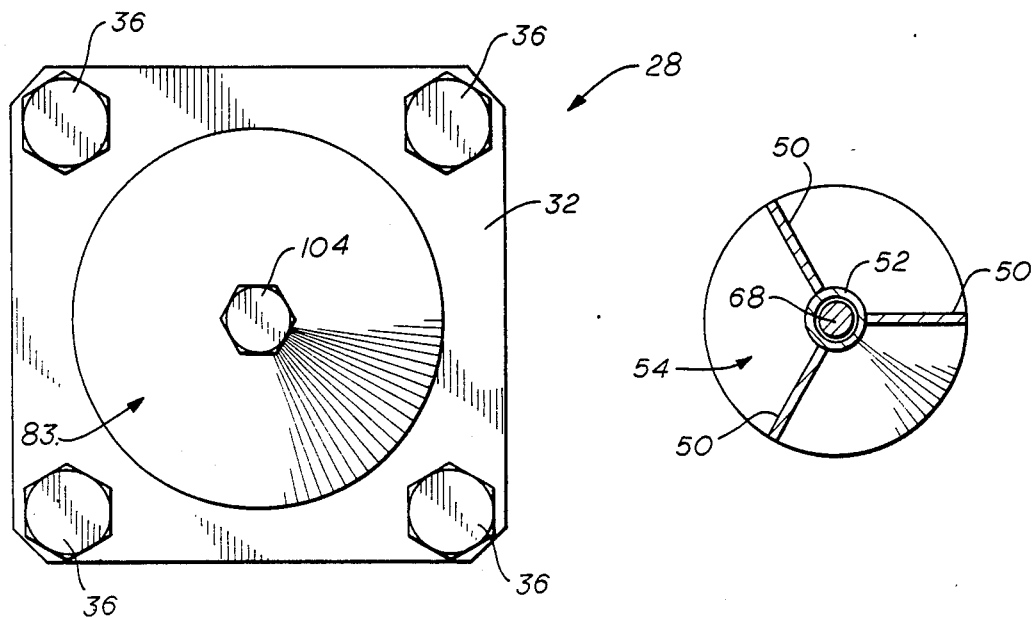
FIG. 3 is a top plan of the pressure relief device comprising the present invention shown in FIGS. 1 and 2 looking generally along line 3—3 of FIG. 1.
FIG. 5 is an enlarged section taken generally along line 5—5 of FIG. 1.

Secured to inner surface 42 is a spider generally indicated at 48 having a plurality of vanes 50 secured to an upper center tube 52 as shown specifically in FIG. 5. Vanes 50 and tube 52 extend from an upper position adjacent seat 44 and are secured adjacent their lower ends to a lower tapered plug generally indicated at 54. Tapered plug 54 has an upper tapered surface 56 and is positioned substantially below uppermost surface 14 of shell 12, thereby to provide a discharge flow passage between tapered surface 56 and opening 16 in shell 12. Tapered plug 54 includes an annular shoulder 57 and lower cylindrical portion 58 having a lower threaded end 60 on which a lower tube 62 is threaded. Tube 62 has a rod guide 64 mounted therein and held in position by a retaining ring 66.

A rod or spindle 68 has an upper threaded end portion 68A and a lower threaded end portion 68B. Spindle 68 is received within tube 52, tapered plug 54, tube 62, and rod guide 64 in sliding relation thereto. An annular seal 69 is mounted within tube 52 and seals about rod 68 to prevent the intrusion of foreign matter within tube 52. Lower threaded end portion 68B which projects from the lower end of tube 62 has a stop 70 threaded onto lower end portion 68B and is secured thereon by jam nut 71. The spacing of stop 70 from rod guide 64 is determined by the desired lift of pressure relief valve 28 and desired discharge opening for the lading within pressure vessel 10. Stop 70 fits closely within the lower end of tube 62 in sealing relation therewith by an annular seal 72 between stop 70 and the inner wall of tube 62. Seal 72 inhibits foreign matter from entering the bore of guide 64, plug 54 and tube 52. Stop 70 engages the lower end of guide 64 in the full open position shown in FIG. 2 to limit the movement of rod 68 and opening of valve 28.

A spring retainer washer 74 is positioned on the lower end of end portion 68B and a nut 76 restrains lower movement of washer 74. A lock nut 78 retains nut 76 in position. Washer 74 has a spring seat 75 thereon and annular shoulder 57 forms an upper spring seat. A pair of inner and outer compression springs 80 and 82 are biased between shoulder 57 and seat 75 to continuously urge rod or spindle 68 and stop 70 thereon to an inner or lowermost position as shown in FIG. 1 with a valve closure generally indicated at 83 in a seated position on seat 44. While springs 80 and 82 are shown in the drawings as being wound in the same direction, it is to be understood that springs 80 and 82 could be wound in opposite directions to each other, if desired.

Figure 4:
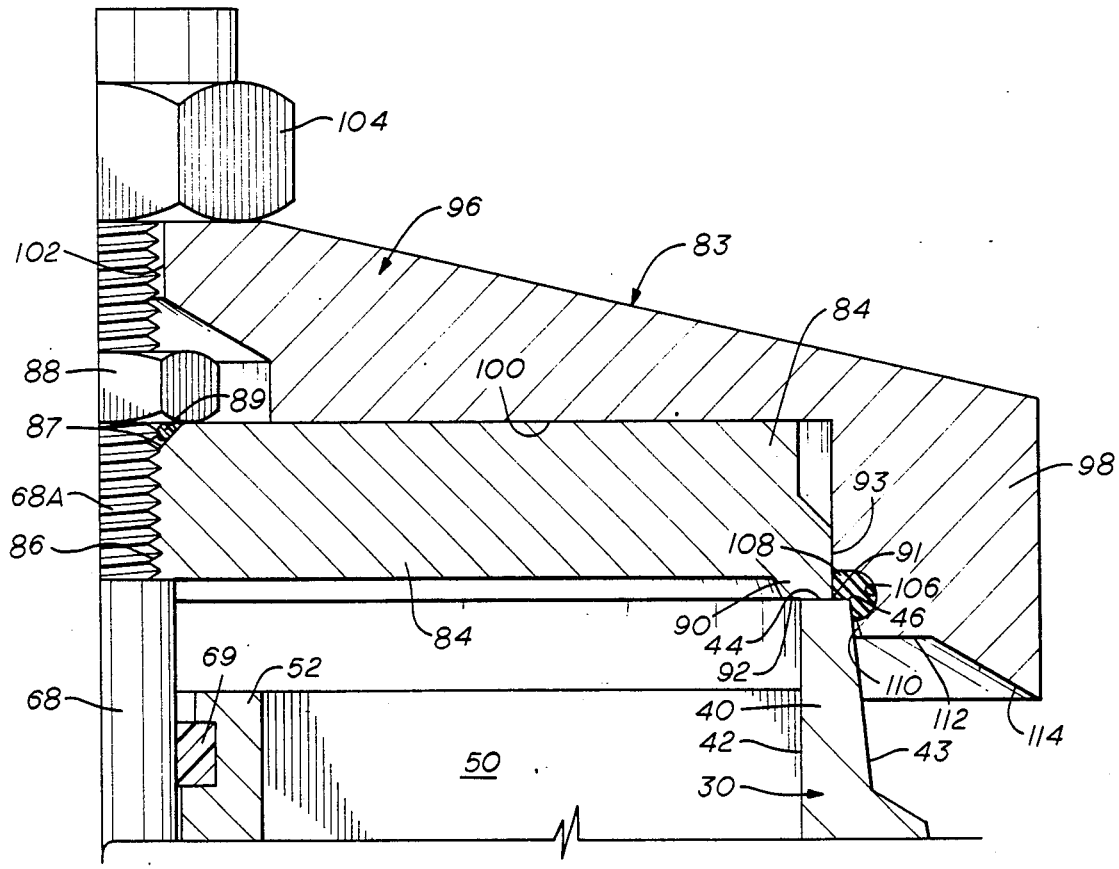
FIG. 4 is an enlarged fragment of FIG. 1 showing the closure and sealing means for the pressure relief device.

Mounted on upper end portion 68A of rod 68 as shown particularly in FIG. 4, is the valve closure 83 which comprises a valve plate or disc 84 having an internally threaded opening 86 threaded onto the threaded end of portion 68A and bottomed thereon. A securing nut 88 secures valve plate or disc 84 in position on upper rod portion 68A. Plate 84 has a taper 87 at the upper end of threaded opening 86 and an oversized Teflon O-ring 89 slightly larger in cross section than taper 87 is crushed by nut 88 into sealing relation with the threads defining threaded opening 86. Plate 84 has an outer peripheral surface 93 and a lower projecting rim 90 defining a relatively sharp edge 91. Rim 90 also defines a lower annular surface 92 which contacts surface 44 on flange 40 to provide a metal-to-metal seal between plate 84 and flange 40 which is a secondary seal for pressure relief device 28. Peripheral surface 93 is spaced inwardly from corner or edge 46 of flange 40.

An outer cap or cover indicated at 96 has a lower depending annular flange 98 which defines a lower cylindrical recess with inner planar surface 100 to receive plate 84 therein. Cover 96 has a central opening 102 receiving threaded end portion 68A and a nut 104 threaded onto end portion 68A holds cap 96 into tight engaging contact with the upper surface of plate 84. Annular flange 98 extends downwardly below seat 44 and has an inner annular groove 106 therein adjacent seat 44 which receives an elastomeric O-ring 108 therein. The lower portion of groove 106 is defined by an inner tapered surface 110 below edge 46 of seat 44 and spaced from the adjacent outer surface of flange 40. The lower or skirt portion of flange 98 is further defined by a horizontal surface 112 adjacent tapered surface 110, and a contiguous downwardly inclined outer surface 114 as shown in FIG. 4.

Figure 2:
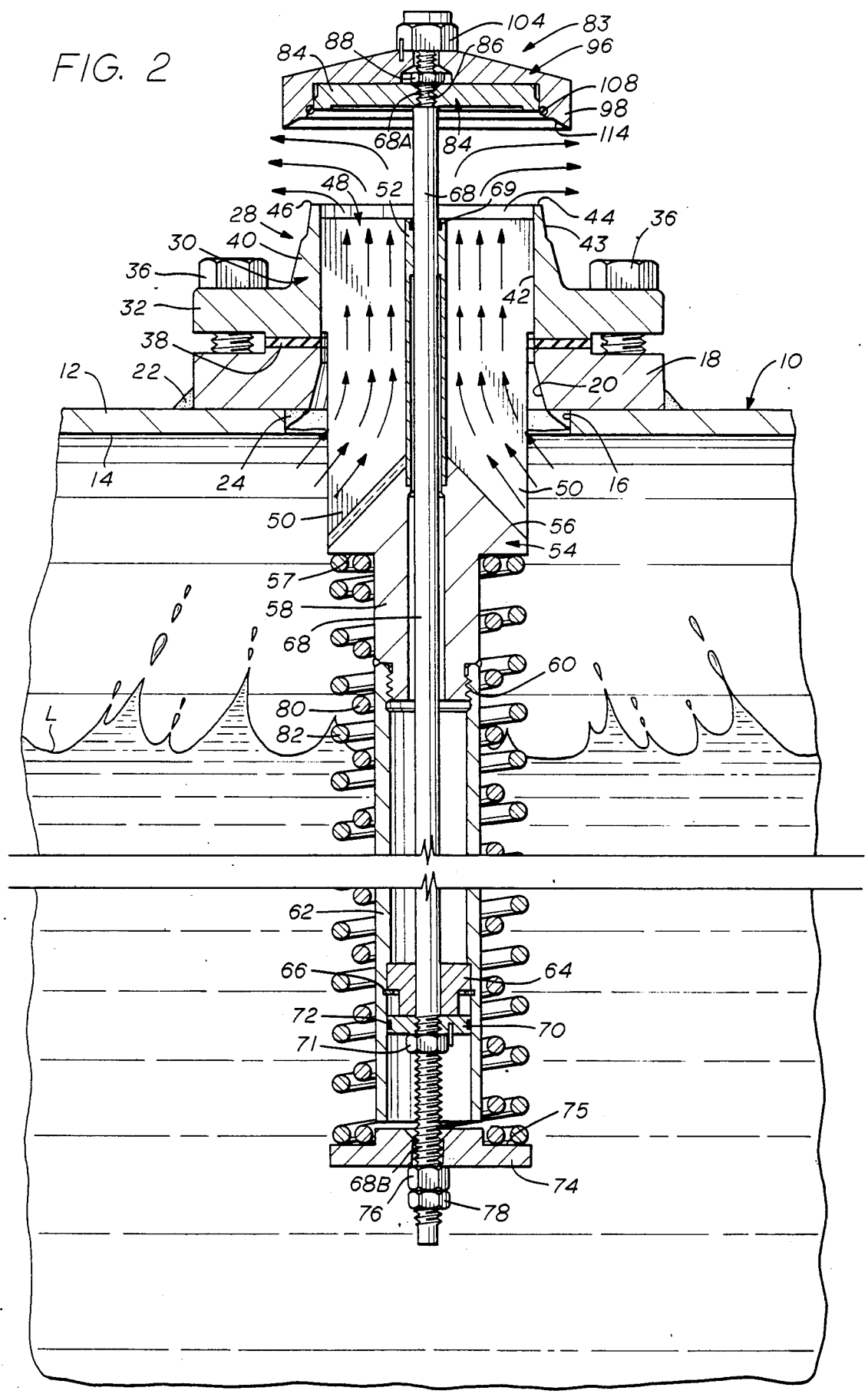
FIG. 2 is a sectional view similar to FIG. 1 but showing the pressure relief device in full open position with the valve closure unseated under a predetermined high fluid pressure within the pressure vessel and relieving fluid pressure from the pressure vessel through the discharge opening.

Around twenty-five percent (25%) of annular groove 106 is below surfaces 44 and 92 which forms the secondary metal-to-metal seal. O-ring 106 has an exposed peripheral surface between tapered surface 110 and the adjacent peripheral surface 93 of plate 84 in the closed position of valve closure 83 shown in FIGS. 1 and 4. This exposed peripheral surface of O-ring 108 comprises about twenty percent (20%) of the entire periphery of O-ring 108 in the closed position. Upon insertion of elastomeric O-ring 108 within groove 106 and assembly of pressure relief device 28, edge 46 contacts the exposed surface of O-ring 108 and deforms O-ring 108 into sealing engagement with plate 84 and flange 40 as shown in FIG. 4 thereby to form a primary elastomeric seal for valve closure 83. In the open position of valve closure 83 as shown in FIG. 2, the exposed surface of O-ring 108 between tapered surface 110 and peripheral surface 93 of plate 84 may comprise as much as one-third of its entire periphery.

O-ring 108 may be easily removed and replaced while plate 84 remains in metal-to-metal sealing relation with seat 44 of flange 40. To replace O-ring 108, nut 104 and cover 96 are removed with O-ring 108 being removed with cover 96. Disc or plate 84 is held in metal-to-metal seated relation with seat 44 by nut 88. Upon replacement of seal 108 within groove 106, cover 96 may again be positioned on upper end portion 68A and nut 104 threaded onto end portion 68A.

FIG. 1 shows pressure relief device 28 in its normal operating condition with springs 80 and 82 urging rod 68 continuously in a downward position, thereby to maintain cover 96 and plate 84 in seated relation on seat 44 of flange 40. Upon the reaching of a predetermined high fluid pressure within tank shell 12, as may occur from accidents, such as overturning of railway tank cars or the like, the fluid pressure from lading L against the lower surface of plate 84 lifts plate 84 upwardly against the bias of springs 80 and 82 to the position of FIG. 2 with such movement being limited by stop 70 contacting guide 64. Upon the initial opening of plate 84 fluid pressure being discharged is exposed to the lower skirt portion of flange 98 and particularly outer inclined surface 114 to assist in lifting of plate 84. Stop 70 may be suitably spaced from guide 64 around forty percent (40%) of the diameter of seal 108, for example, and in the raised position of cover 94 as shown in FIG. 2, the fluid pressure within shell 12 will be discharged along vanes 50 of spider 48 above tapered plug 54 and springs 80 and 82.

It is noted that tapered plug 54 and springs 80, 82 are arranged at a location substantially below the uppermost surface 14 of shell 12 and springs 80 and 82 do not interfere with the discharge of the pressurized lading L. Further, tube 52 is of a diameter about one-fifth (1/5th) the diameter of the discharge opening formed by peripheral surface 42 and does not occupy much of the discharge opening thereby to provide a maximum flow area for the discharged fluid. Upon the decrease of fluid pressure within shell 12 acting on the undersurface of valve closure 83 to a predetermined low amount, springs 80 and 82 will urge washer 74 and rod 68 to the position of FIG. 1 with plate 84 and cover 96 returning to sealing and seating relation with flange 40.

Valve closure 83 will move to a full open position in a so-called pop or snap action at a fluid pressure less than ten percent (10%) above the predetermined fluid pressure at which valve closure 83 is set to begin to open. Initially fluid pressure acts on the area defined by seal 108 and seat 44. As the valve closure 83 begins to lift and the seal is broken, fluid pressure begins to act on a larger area defined by closure 83 including the skirt portion of flange 98 comprising surfaces 112 and 114. This additional area and particular shape of surfaces 112 and 114 combine to lift the valve to a full open position with little increase in fluid pressure thus giving the snap-action characteristic.

From the foregoing, it will be understood that the pressure relief device comprising the present invention has a minimum projecting height from the outer surface of shell 12 and the diameter of the discharge opening is relatively small but has a maximum flow area through the discharge opening with a minimum of obstruction. This is obtained by having tapered plug 54 positioned a substantial distance below the uppermost portion of shell 12 with springs 80 and 82 below the upper surface of plug 54 defining the flow area.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present inventon as set forth in the following claims.

What is claimed is:

1. A pressure relief device adapted to be movably mounted on a pressure vessel and to extend into the pressure vessel through a lading discharge opening in the wall of the pressure vessel, said pressure relief device comprising:

an outer mounting support having a vertically extending flange about the discharge opening and defining an upper horizontal surface forming an annular seat;

a valve plate mounted on said support and having a lower surface engaging said annular seat in metal-to-metal seating relation, said valve plate exposed to fluid pressure within the pressure vessel;

an outer cover receiving said valve plate therein and having an outer peripheral flange extending downwardly alongside said plate to said annular seat, said valve plate and cover defining a valve closure movable between open and closed positions relative to said discharge opening;

elastomeric sealing means sealing between said cover and said valve plate;

means to retain said valve plate and cover in a seated position on said annular seat at a fluid pressure within the pressure vessel below a predetermined fluid pressure for closing said discharge opening and to permit unseating of said valve plate and cover above a predetermined fluid pressure within the pressure vessel for opening said discharge opening, said means to retain including a spindle having an extending outer end received within aligned central openings in said plate and cover and having a lower end extending within the pressure vessel;

removable securing means to removably secure said plate onto the extending outer end of said spindle adjacent the central opening in said plate;

separate removable securing means removably securing said cover onto the extending end of said spindle adjacent the central opening in said cover whereby said cover may be removed from said spindle with said plate remaining in metal-to-metal seated positon on said annular seat; and spring means operatively connected to the spindle for continuously urging said cover and valve plate downwardly to the seated position of the plate on said annular seat, the fluid pressure within the pressure vessel acting against said valve plate and against the bias of said spring means whereby upon the reaching of a predetermined high fluid pressure in the pressure vessel said valve plate and cover are unseated for relieving fluid pressure from the pressure vessel.

2. The pressure relief device as set forth in claim 1 wherein said cover carries said elastomeric sealing means for sealing between said cover and said valve plate, said elastomeric sealing means being removed with said cover upon removal of said cover from said spindle thereby to permit replacement of said sealing means.

3. A pressure relief device as set forth in claim 1 wherein said extending outer end of said spindle is externally threaded;
   a nut is threaded on said elongate member below said cover for securing the plate thereon; and
   a separate nut is threaded on said externally threaded outer end of said spindle above said cover for securing the cover to said spindle.

4. A pressure relief device adapted to be connected to a lower mounting member about a lading discharge opening in the wall of a pressure vessel for the discharge of lading from the vessel at a predetermined high fluid pressure within the vessel; said pressure relief device comprising:
   an upper mounting support mated with and secured to said loer mounting member on the pressure vessel about the discharge opening and having an outer annular seat thereon surrounding the discharge opening;
   a valve closure for the discharge opening including a valve plate seated on said annular seat in a metal-to-metal seating relation and exposed to fluid pressure inside the pressure vessel, an outer cover receiving said valve plate therein and having an outer peripheral flange extending downwardly alongside said plate below said annular seat, and resilient sealing means between said peripheral flange and said annular seat;
   an elongate rod-like member secured at its upper end to said valve plate and to said cover, said elongate member extending the entire length of the pressure relief device downwardly from said valve closure through said discharge opening to a position spaced substantially from the discharge opening to provide a major portion of the length of the elongate member projecting within the vessel;
   a plurality of vertically extending radially spaced vanes secured to the inner peripheral surface of the mounting support defining said discharge opening and extending within the interior of the pressure vessel a substantial distance below the discharge opening;
   a plug having an upper tapered surface secured to the lower ends of said plurality of vanes to define a flow passage between the upper tapered surface of the plug and the pressure vessel opening for the lading upon opening of the valve closure, said plug having a central bore receiving said rod-like member and a reduced diameter lower cylindrical portion defining an annular shoulder at its upper end, a tubular member secured to said plug and extending upwardly therefrom and receiving said rod-like member for relative movement with said vanes being secured to the outer periphery of said tubular member and extending radially therefrom; and
   spring means braced between said shoulder and the lower end of said rod-like member for continuously urging said cover, plate, and elongate member downwardly to the seated position of the cover and plate on said annular seat, the fluid pressure within the pressure vessel acting against said valve plate and against the bias of said spring means to unseat said plate and cover upon the reaching of a predetermined high fluid pressure within the pressure vessel for relieving fluid pressure from the pressure vessel.

5. A pressure relief device as set forth in claim 4 wherein said plate and said cover have aligned central openings therein receiving an extending threaded end of said elongate member;
   a nut is threaded on said elongate member below said cover for securing the plate thereon; and
   a separate nut is threaded on said elongate member above said cover for securing the cover on said elongate member.

* * * * *